United States Patent
Madan et al.

(10) Patent No.: US 10,448,313 B2
(45) Date of Patent: Oct. 15, 2019

(54) IDENTIFYING USERS VIA MOBILE HOTSPOTS

(71) Applicant: GOOGLE LLC, Mountain View, CA (US)

(72) Inventors: Arjita Madan, Hyderabad (IN); Sumit Gwalani, Hyderabad (IN); Paridhi Rawat, Hyderabad (IN); Heman Khanna, Hyderabad (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/949,176

(22) Filed: Apr. 10, 2018

(65) Prior Publication Data

US 2018/0295564 A1    Oct. 11, 2018

Related U.S. Application Data

(60) Provisional application No. 62/484,319, filed on Apr. 11, 2017.

(51) Int. Cl.
*H04W 48/04* (2009.01)
*H04W 4/021* (2018.01)
(Continued)

(52) U.S. Cl.
CPC .......... *H04W 48/04* (2013.01); *G06F 16/955* (2019.01); *G06Q 20/327* (2013.01);
(Continued)

(58) Field of Classification Search
None
See application file for complete search history.

(56) References Cited

U.S. PATENT DOCUMENTS 9,264,850 B1   2/2016   Lee
2008/0176583 A1*  7/2008   Brachet ................. G01S 5/0236
                                                                455/456.3

(Continued)

FOREIGN PATENT DOCUMENTS

WO   2016161117 A1   10/2016
WO   2018/191200 A1   10/2018

OTHER PUBLICATIONS

Koestel, "International Search Report and Written Opinion issued in International Application No. PCT/US2018/026790", dated Jun. 27, 2018, 14 pages.

(Continued)

*Primary Examiner* — Khaled M Kassim
(74) *Attorney, Agent, or Firm* — Johnson, Marcou & Isaacs, LLC

(57) ABSTRACT

A user device receives a service device identifier via a Wi-Fi scan at a location and transmits the received service device identifier to an management system via a network. If the management computing system receives multiple service device identifiers from the user computing device, the management computing system receives location data of the user computing device and signal strength data associated with each of the service device identifiers. The management system receives location data from the user computing device and determines a particular service device identifier from the multiple identified service device identifiers having a strongest signal strength where the user computing device location data also indicates the user computing device to be located within a geofence boundary associated with the service device. The management system transmits user account information to the selected service system computing device.

20 Claims, 6 Drawing Sheets

(51) Int. Cl.
*H04L 29/06* (2006.01)
*G06F 16/955* (2019.01)
*G06Q 20/32* (2012.01)

(52) U.S. Cl.
CPC ....... *G06Q 20/3224* (2013.01); *H04L 63/083* (2013.01); *H04L 63/0861* (2013.01); *H04W 4/021* (2013.01)

(56) References Cited

U.S. PATENT DOCUMENTS

| | | | | |
|---|---|---|---|---|
| 2008/0242278 | A1* | 10/2008 | Rekimoto | H04L 63/0407 455/414.2 |
| 2008/0248801 | A1* | 10/2008 | Fletcher | H04W 4/02 455/435.2 |
| 2012/0136923 | A1* | 5/2012 | Grube | H04W 4/90 709/203 |
| 2013/0225282 | A1* | 8/2013 | Williams | A63F 13/216 463/29 |
| 2013/0295962 | A1* | 11/2013 | Manroa | H04W 4/02 455/456.3 |
| 2014/0351328 | A1* | 11/2014 | Woods | H04W 4/021 709/204 |
| 2014/0351411 | A1* | 11/2014 | Woods | H04W 4/021 709/224 |
| 2015/0031388 | A1* | 1/2015 | Chatterjee | H04W 4/021 455/456.1 |
| 2015/0163851 | A1* | 6/2015 | Babaei | H04W 4/021 370/329 |
| 2015/0172863 | A1* | 6/2015 | Brachet | G01S 5/0236 455/456.1 |
| 2015/0269624 | A1* | 9/2015 | Cheng | G06Q 30/0267 705/14.58 |
| 2016/0012413 | A1* | 1/2016 | Chitilian | G06Q 20/3224 705/44 |
| 2016/0203522 | A1* | 7/2016 | Shiffert | H04W 76/14 705/14.58 |
| 2017/0188233 | A1* | 6/2017 | Gupta | H04L 67/16 |
| 2017/0223498 | A1* | 8/2017 | Banavar | H04W 4/021 |
| 2017/0364901 | A1* | 12/2017 | Chandrasekaran | H04B 17/318 |
| 2018/0077545 | A1* | 3/2018 | Arunachalam | H04W 4/80 |
| 2019/0149688 | A1* | 5/2019 | Flowerday | G06F 16/435 |
| 2019/0155833 | A1* | 5/2019 | Flowerday | G06F 16/487 |

OTHER PUBLICATIONS

Koestel "International Preliminary Report on Patentability issued in International Application No. PCT/US2018/026790", dated Mar. 26, 2019, 7 pages.

\* cited by examiner ial Patent
IDENTIFYING USERS VIA MOBILE HOTSPOTS

CROSS-REFERENCE TO RELATED APPLICATIONS

This application claims priority to U.S. Provisional Patent Application No. 62/484,319 filed Apr. 11, 2017, and entitled "Identifying Users Via Mobile Hotspots." The entire disclosure of the above-identified priority application is hereby fully incorporated herein by reference.

TECHNICAL FIELD

The present disclosure relates to transmitting information over audio communication channels, and particularly to transmitting information via audio communication channels via sound emitting devices.

BACKGROUND

When users initiate service requests at a location, many methods of conducting a service request are available. Service systems find it useful to intelligently detect when a user is nearby (or inside) a location to enable the service system to provide additional services. In conventional technology, this could be achieved by installing Wi-Fi beacons, Bluetooth beacons, or Bluetooth low energy ("BLE") beacons at the location or by gaining access to and logging location information on user computing devices associated with users. However, installing beacons requires additional hardware from service systems, are extremely short range, and cannot be reliably detected by some user computing devices. Further, gaining access to location information on the user computing device requires that the user perform additional actions or steps. It also requires the service system to be mapped to a geolocation, which is not available or performed in many locations.

SUMMARY

According to an aspect, a computer-implemented method to identify users comprises receiving, by one or more computing devices and from a user computing device, an account identifier of a user, and a service system computing device network identifier, wherein the user computing device receives the service system computing device network identifier via a Wi-Fi scan at a location of a service system; retrieving, by the one or more computing devices, user account information associated with the user based at least in part on the account identifier of the user; identifying, by the one or more computing devices, a service system computing device associated with the service system computing device network identifier; and transmitting, by the one or more computing devices, the user account information to the service system computing device.

According to another aspect, a computer program product comprises a non-transitory computer-readable medium having computer-readable program instructions embodied thereon that when executed by a computer cause the computer to perform any of the methods described herein.

According to another aspect, a system to identify users comprises a storage device and a processor communicatively coupled to the storage device, wherein the processor executes application code instructions that are stored in the storage device to cause the system to receive, from a user computing device, an account identifier of a user and a service system computing device network identifier, wherein the user computing device receives the service system computing device network identifier via a Wi-Fi scan at a location of a service system; retrieve user account information associated with the user based at least in part on the account identifier of the user; identify a service system computing device associated with the service system computing device network identifier; and transmit user account information to the service system computing device.

DETAILED DESCRIPTION OF THE EXAMPLES

Overview

Figure 1:
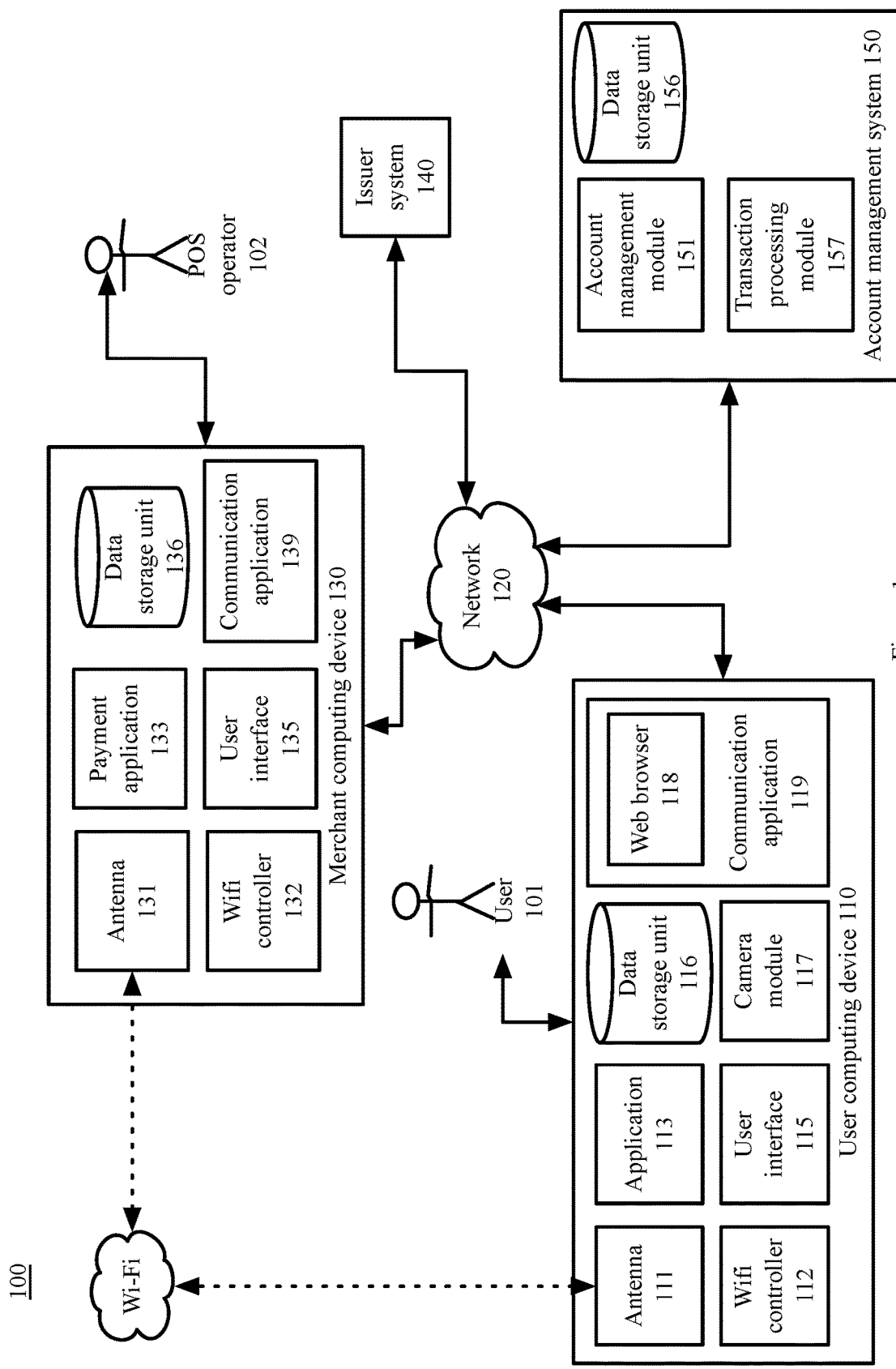
FIG. 1 is a block diagram depicting a system for conducting a hands-free transaction, in accordance with certain example embodiments.

Techniques herein provide a computer-implemented method to identify users, for example, in connection with conducting a hands-free service request. The invention is defined by the independent claims. Developments of the invention are defined in the dependent claims.

In an example, a service system registers with an account management computing system. The service system installs a service system application on a service system computing device and receives a service system computing device network identifier from the account management computing system. The service system configures settings on the service system computing device to activate a mobile hotspot on the service system computing device at a service system location. The service system computing device broadcasts the service system computing device network identifier when the mobile hotspot is activated. In an example, the service system computing device communicates data to the account management computing system and receives data from the account management computing system via a network. The account management computing system logs a hardware identifier associated with the service system computing device. An example hardware identifier comprises a MAC address, a Wi-Fi access point ("AP") name, a fingerprint, or other identifier. In an example, the account management computing system executes a set of commands, functions, protocols, or application programming interfaces ("APIs"). In an example, the account management computing system registers the service system. For example, the account management computing system generates a service system identifier for the service system and maps location data to the service system computing device identifier and the service system identifier.

In an example, a user establishes an account with the account management computing system and downloads an application on a user computing device associated with the user. For example, the user accesses an account management computing system website via a user computing device associated with the user. The user registers with the account management computing system and downloads an application onto the user computing device. In an example, the user transmits a facial image to the account management computing system via the user computing device. The account management computing system associates the facial image with the user account. In another example, the user transmits a username and password to the account management computing system, or other verification information such as a name, username, email, phone number, a lock for an application, a device lock, and/or a numeric PIN. The account management computing system associates the username and password or other verification information with the user account.

In an example, the user enters the service system location with the user computing device and signs into the application. For example, signing in to the application comprises selecting the application on a user interface of the user computing device, entering the username and password or other verification information associated with the user account, and selecting a login button. In an example, the user brings the user computing device within a threshold distance of the service system computing device. The user computing device receives the service system computing device network identifier, for example, from the service system beacon device via a Wi-Fi communication channel. In an example, the user computing device transmits the service system computing device network identifier to the account management computing system via a network. For example, the user computing device receives the service system computing device network identifier by conducting a Wi-Fi scan and detecting the service system computing device network identifier identifying the mobile hotspot of the service system computing device.

In an example, the account management computing system receives the service system computing device network identifier from the user computing device. In an example, the account management computing system identifies the service system identifier associated with the service system computing device network identifier based on the service system computing device network identifier received from the user computing device. In an example in which the account management computing system receives multiple service system computing device network identifiers, the account management computing system receives location data of the user computing device and signal strength data associated with each of the service system computing device network identifiers. The account management computing system determines a particular service system identifier from the multiple identified service system identifiers by selecting the service system identifier associated with the strongest signal strength.

In an example, the account management computing system transmits user account identifiers to the service system computing device in response to identifying the service system identifier and the service system computing device identifier.

In an example, the user approaches the service system computing device. The service system computing device operator selects an option on the service system computing device to initiate a service request using the application. The service system computing device operator is able to identify the user during checkout based on the user account information, an associated user facial image, and/or a username and password or other verification information received from the account management computing system.

In an example, the service system computing device displays accounts of the identified user account. For example, after receiving the identity of the user account from the service system computing device, the account management computing system transmits information associated with one or more accounts of the identified user. The service system computing device operator selects a user account for service request and confirms the service request with permission and direction of the user. The service system computing device transmits service request details to the account management computing system. The account management computing system transmits a service request authorization request via a network to an issuer system based on the service request details. The issuer system approves the service request authorization request and transmits a service request authorization approval to the account management computing system via the network. The account management computing system transmits a service request receipt to the service system computing device via the network indicating the approval of the service request authorization request.

By using and relying on the methods and systems described herein, the account management computing system, the service system computing device, and the user computing device enable the user to conduct a service request with the service system without the user having to interact with the user computing device or produce identity documents or physical payment cards, as required in some current technology. As such, the systems and methods described herein reduces the inputs required by the user via the user computing device and the inputs required by the service system computing device operator to identify the user. Further, by using and relying on the methods and systems described herein, the account management computing system, the service system computing device, and the user computing device enable the user to conduct a service request with the service system without the service system having to install network beacons. As such, the systems and methods described herein reduces the inputs and hardware required by the service system and allow the service system to operate using only a mobile hotspot of the service system computing device instead of having to also install a service system beacon device or other network hardware.

Example System Architecture

Turning now to the drawings, in which like numerals indicate like (but not necessarily identical) elements throughout the figures, example embodiments are described in detail.

FIG. 1 is a block diagram depicting a system 100 for identifying users, for example, in connection with conducting a hands-free transaction, in accordance with certain example embodiments. As depicted in FIG. 1, the system 100 includes network computing devices 110, 130, 140, and 150 that are configured to communicate with one another via one or more networks 120. In some embodiments, a user associated with a device must install an application and/or make a feature selection to obtain the benefits of the techniques described herein.

In example embodiments, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 130, 140, and 150 includes a device having a communication module capable of transmitting and receiving data over the network 120. For example, each network computing device 110, 130, 140, and 150 can include a server, desktop computer, laptop computer, tablet computer, a television with one or more processors embedded therein and/or coupled thereto, smart mobile phone, handheld computer, personal digital assistant ("PDA"), or any other wired or wireless, processor-driven device. In the example embodiment depicted in FIG. 1, the network computing devices 110, 130, 140, and 150 are operated by users 101, merchant computing device 130 operators 102, issuer system 140 operators, and account management computing system 150 operators, respectively.

An example user computing device 110 comprises an antenna 111, a Wi-Fi controller 112, a payment application 113, a user interface 115, a data storage unit 116, a camera module 117, a web browser 118, and a communication application 119.

In an example embodiment, the antenna 111 is a means of communication between the user computing device 110 and a merchant computing system beacon device 120. In an example embodiment, a Wi-Fi controller 112 outputs through the antenna 111 a radio signal, or listens for radio signals from the merchant computing system beacon device 120. In another example embodiment a Bluetooth controller or a near field communication ("NFC") controller is used. In an example embodiment, the Wi-Fi controller 112 outputs through the antenna 111 a radio signal, or listens for radio signals from the payment card device 120.

In an example embodiment, the Wi-Fi controller 112 is capable of sending and receiving data, performing authentication and ciphering functions, and directing how the user computing device 110 will listen for transmissions from the merchant computing system beacon device 120 or configuring the user computing device 110 into various power-save modes according to Wi-Fi-specified procedures. In another example embodiment, the user computing device 110 comprises a Bluetooth controller or an NFC controller capable of performing similar functions. An example Wi-Fi controller 112 communicates with the payment application 113 and is capable of sending and receiving data over a wireless, Wi-Fi communication channel. In another example embodiment, a Bluetooth controller 112 or NFC controller 112 performs similar functions as the Wi-Fi controller 112 using Bluetooth or NFC protocols. In an example embodiment, the Wi-Fi controller 112 activates the antenna 111 to create a wireless communication channel between the user computing device 110 and the merchant computing system beacon device 120. The user computing device 110 communicates with the merchant computing system beacon device 120 via the antenna 111. In an example embodiment, when the user computing device 110 has been activated, the Wi-Fi controller 112 polls through the antenna 111 a radio signal, or listens for radio signals from the merchant computing system beacon device 120.

In an example embodiment, the payment application 113 is a program, function, routine, applet, or similar entity that exists on and performs its operations on the user computing device 110. In certain example embodiments, the user 101 must install the payment application 113 and/or make a feature selection on the user computing device 110 to obtain the benefits of the techniques described herein. In an example embodiment, the user 101 accesses payment application 113 on the user computing device 110 via the user interface 115. In an example embodiment, the payment application 113 is associated with the account management computing system 150. In another example embodiment, the payment application 113 is associated with a merchant computing system.

In an example embodiment, the user interface 115 enables the user 101 to interact with the payment application 113 and/or web browser 118. For example, the user interface 115 comprises a touch screen, a voice-based interface, or any other interface that allows the user 101 to provide input and receive output from an application or module on the user computing device 110. In an example embodiment, the user 101 interacts via the user interface 115 with the payment application 113 and/or web browser 118 to configure user 101 accounts on the account management computing system 150. In another example embodiment, the user 101 interacts via the user interface 115 with the payment application 113 and/or the web browser 118 to enable hands-free payments, if needed.

In an example embodiment, the data storage unit 116 comprises a local or remote data storage structure accessible to the user computing device 110 suitable for storing information. In an example embodiment, the data storage unit 116 stores encrypted information, such as HTML5 local storage.

In an example embodiment, the camera module 117 comprises any module or function of the user computing device 110 that obtains a digital image. The camera module 117 is resident on the user computing device 110 or in any manner logically connected to the user computing device 110. For example, the camera module 117 is connected to the user computing device 110 via the network 120. The camera module 117 is capable of obtaining individual images or a video scan. Any other suitable image capturing device is represented by the camera module 117.

In an example embodiment, the user 101 can use a communication application 119, such as a web browser 118 application or a stand-alone application, to view, download, upload, or otherwise access documents or web pages via a distributed network 120.

In an example embodiment, the web browser 118 can enable the user 101 to interact with web pages using the user computing device 110. In an example embodiment, the user 101 accesses the user's 101 account maintained by the account management computing system 150 via the web browser 118. In another example embodiment, the user 101 accesses the merchant computing system website via the web browser 118. In certain example embodiments described herein, one or more functions performed by the payment application 113 can also be performed by a web browser 118 application associated with the account management computing system 160.

In an example embodiment, the communication application 119 can interact with web servers or other computing devices connected to the network 120, including the user computing device 110 and a web server of a merchant computing system.

In certain example embodiments, one or more functions herein described as performed by the payment application 113 can also be performed by a web browser 118 application, for example, a web browser 118 application associated with a merchant computing system website or associated with the account management computing system 150. In certain example embodiments, one or more functions herein described as performed by the payment application 113 can also be performed by the user computing device 110 operating system. In certain example embodiments, one or more functions herein described as performed via the web browser 118 can also be performed via the payment application 113.

An example merchant computing device 130 comprises an antenna 131, a Wi-Fi controller 132, a payment application 133, a user interface 135, a data storage unit 136, and a communication application 139.

In an example embodiment, the antenna 131 is a means of communication between the user computing device 110 and a merchant computing device 130. In an example embodiment, a Wi-Fi controller 132 outputs through the antenna 131 a radio signal, or listens for radio signals from the user computing device 110. In another example embodiment a Bluetooth controller or a near field communication ("NFC") controller is used. In an example embodiment, the Wi-Fi controller 132 outputs through the antenna 131 a radio signal, or listens for radio signals from the user computing device 110.

In an example embodiment, the Wi-Fi controller 132 is capable of sending and receiving data, performing authentication and ciphering functions, and directing how merchant computing device 130 will listen for transmissions from the user computing device 110 according to Wi-Fi-specified procedures. In another example embodiment, the merchant computing device 130 comprises a Bluetooth controller or Bluetooth low energy ("BLE") controller capable of performing similar functions. An example Wi-Fi controller 132 communicates with the payment application 133 and is capable of sending and receiving data over a wireless, Wi-Fi communication channel. In another example embodiment, a Bluetooth controller or BLE controller performs similar functions as the Wi-Fi controller 132 using Bluetooth or BLE protocols. In an example embodiment, the Wi-Fi controller 132 activates the antenna 131 to create a wireless communication channel between the user computing device 110 and the merchant computing system beacon device 120. The merchant computing device 130 communicates data to the user computing device 110 via the antenna 131. In an example embodiment, when the merchant computing device 130 has been activated, the Wi-Fi controller 132 polls through the antenna 131 a radio signal, or listens for radio signals from the user computing device 110. In an example, the Wi-Fi controller 132 broadcasts, via the antenna 131, a merchant computing device 130 network identifier associated with a mobile hotspot of the merchant computing device 130.

In an example embodiment, the payment application 133 is a program, function, routine, applet, or similar entity that exists on and performs its operations on the merchant computing device 130. In certain example embodiments, the merchant computing device operator 102 or other merchant computing system operator must install the payment application 133 and/or make a feature selection on the merchant computing device 130 to obtain the benefits of the techniques described herein. In an example embodiment, the merchant computing device operator 102 accesses the payment application 133 on the merchant computing device 130 via the user interface 135. In an example embodiment, the payment application 133 is associated with the account management computing system 150. In another example embodiment, the payment application 133 is associated with a merchant computing system associated with the merchant computing device 130, In an example embodiment, the user interface 135 enables the merchant computing device operator 102 to interact with the merchant computing device 130. For example, the user interface 135 comprises a touch screen, a voice-based interface, or any other interface that allows the merchant computing device operator 102 to provide input and receive output from an application or module on the merchant computing device 130. In an example embodiment, the merchant computing device operator 102 interacts via the user interface 135 with the payment application 133.

In an example embodiment, the data storage unit 136 comprises a local or remote data storage structure accessible to the merchant computing device 130 suitable for storing information. In an example embodiment, the data storage unit 136 stores encrypted information, such as HTML5 local storage.

In an example embodiment, the communication application 139, such as a web browser application or a stand-alone application, enables an operator 102 of the merchant computing device 130 to view, download, upload, or otherwise access documents or web pages via a distributed network 120. For example, the communication application 139 enables communication over the network 120 with the account management computing system 150.

An example issuer system 140 approves or denies a payment authorization request received from the account management computing system 150. In an example embodiment, the issuer system 150 communicates with the account management computing system 150 over the network 120. In an example embodiment, the issuer system 140 communicates with an acquirer system to approve a credit authorization and to make payment to the account management computing system 150 and/or merchant computing system. For example, the acquirer system is a third party account management company.

An example account management computing system 150 comprises an account management module 151, a data storage unit 156, and a transaction processing module 157.

In an example embodiment, the account management module 151 manages one or more user 101 accounts. In an example embodiment, a user 101 account comprises a digital wallet account, an email account, a social networking account, or any other appropriate account associated with the account management computing system 150. In an example embodiment, the account management computing system 151 communicates with a payment application 113 operating on a user computing device 110 associated with a user 101 having a user 101 account with the account management computing system 150. In an example embodiment, the user 101 enters account information into the user 101 account via the payment application 113 and the account management module 151 receives the account information over the network 120 and associates the received account information with the user 101 account.

In an example embodiment, the data storage unit 156 comprises a local or remote data storage structure accessible to the account management computing system 150 suitable for storing information. In an example embodiment, the data storage unit 156 stores encrypted information, such as HTML5 local storage.

In an example embodiment, the transaction processing module 157 receives transaction details from a merchant computing device 130 and a request to initiate a transaction. Example transaction details comprise service system account information, a total amount of the transaction, and a user 101 selection of a user 101 account associated with the user's 101 account with the account management computing system 150. For example, the user's 101 account is a digital wallet account comprising one or more account information corresponding to one or more respective accounts of the user 101. In an example embodiment, the transaction processing module 157 extracts account information from the user 101 account corresponding to the user 101 selection of the user 101 account received in the transaction details from the merchant computing device 130. In an example embodiment, the transaction processing module 157 transmits a payment authorization request to an issuer system 140 or other appropriate financial institution associated with the account selected by the user 101 for use in the service request. An example payment authorization request may comprise merchant computing system account information, user 101 account information, and a total amount of the transaction. In an example embodiment, after the issuer system 140 processes the payment authorization request, the transaction processing module 157 receives an approval or denial of the payment authorization request from the issuer system 140 over the network 120. In an example embodiment, the transaction processing module 157 transmits a receipt to the merchant computing device 130 and/or the user computing device 110 comprising a summary of the service request.

It will be appreciated that the network connections shown are example and other means of establishing a communications link between the computers and devices can be used. Moreover, those having ordinary skill in the art having the benefit of the present disclosure will appreciate that the user computing device 110, the service system computing device 130, the issuer system 140, and the account management computing system 150 illustrated in FIG. 1 can have any of several other suitable computer system configurations. For example, a user computing device 110 embodied as a mobile phone or handheld computer may or may not include all the components described above.

Figure 6:
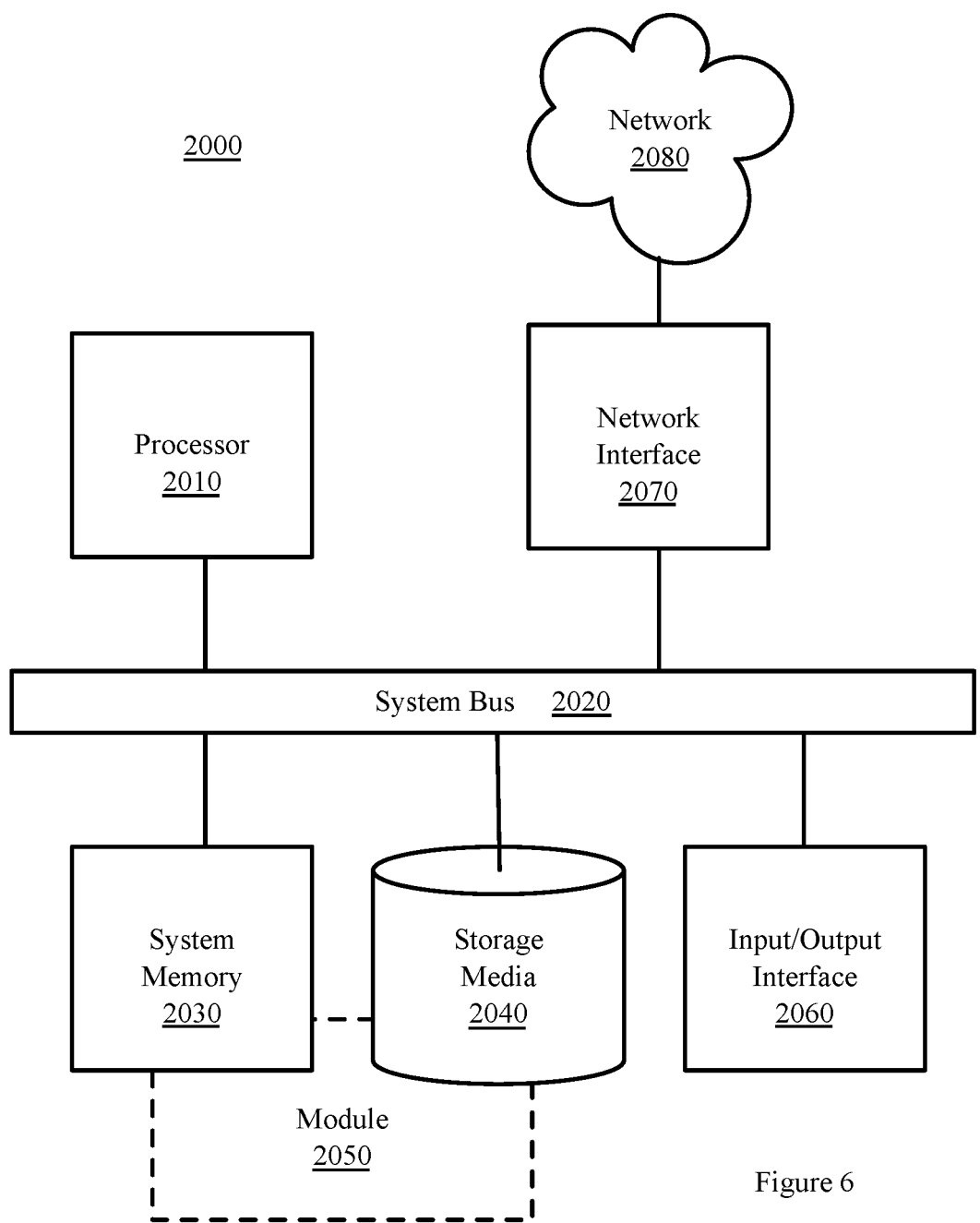
FIG. 6 is a block diagram depicting a computing machine and module, in accordance with certain examples.

In example embodiments, the network computing devices and any other computing machines associated with the technology presented herein may be any type of computing machine such as, but not limited to, those discussed in more detail with respect to FIG. 6. Furthermore, any modules associated with any of these computing machines, such as modules described herein or any other modules (scripts, web content, software, firmware, or hardware) associated with the technology presented herein may by any of the modules discussed in more detail with respect to FIG. 6. The computing machines discussed herein may communicate with one another as well as other computer machines or communication systems over one or more networks, such as network 120. The network 120 may include any type of data or communications network, including any of the network technology discussed with respect to FIG. 6.

Example Processes

The example methods illustrated in FIGS. 2-5 are described hereinafter with respect to the components of the example operating environment 100. The example methods of FIGS. 2-5 may also be performed with other systems and in other environments. The operations described with respect to any of the FIGS. 2-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
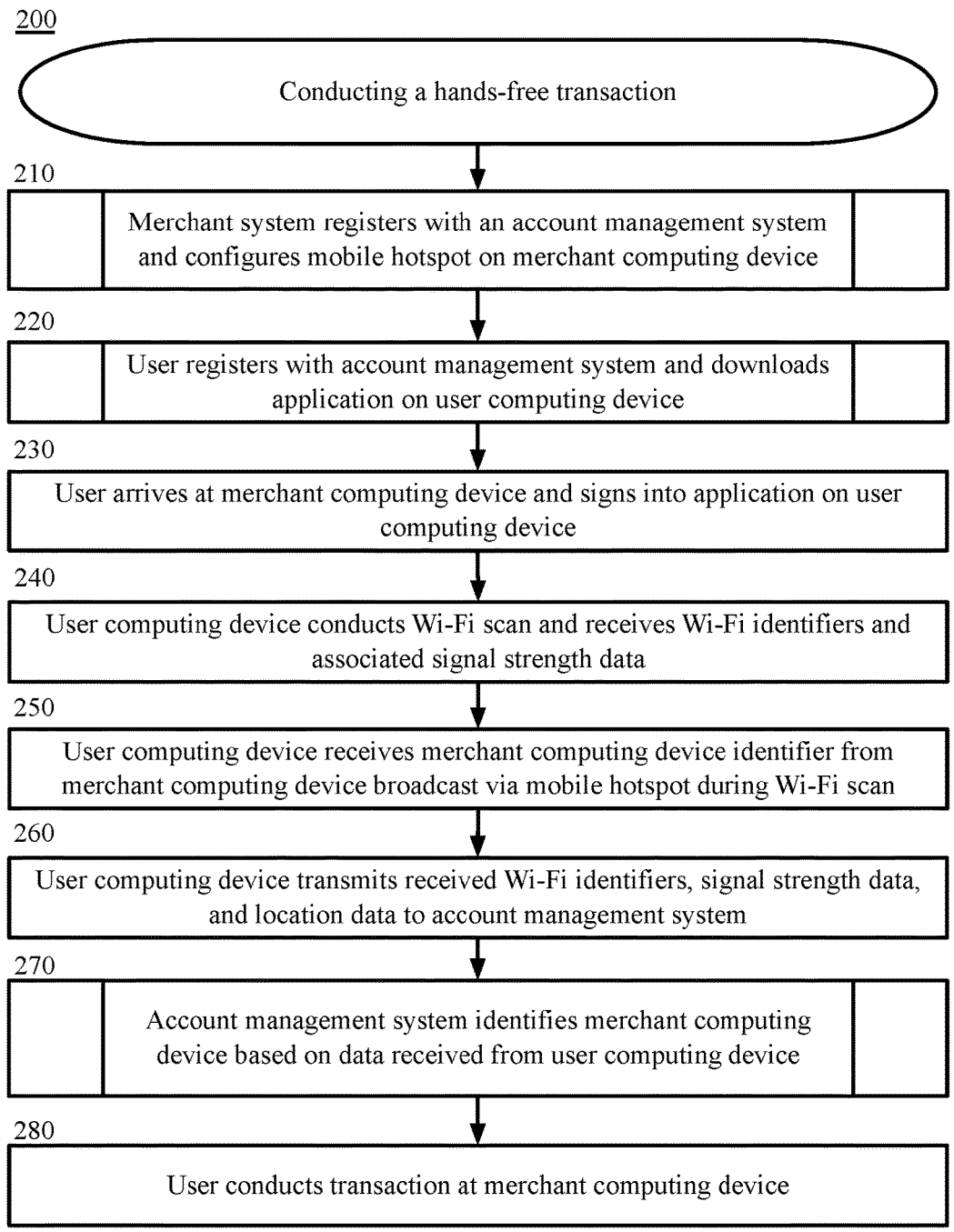
FIG. 2 is a block diagram depicting a method for conducting a hands-free transaction, in accordance with certain examples.

FIG. 2 is a block diagram depicting a method 200 for conducting a hands-free transaction, in accordance with certain examples. An example hands-free transaction comprises a transaction or service request that requires little or no user 101 interaction with a user computing device 110 to initiate or complete the transaction or service request. In an example hands-free transaction, a user 101 may be signed in to an application 113 that communicates via a network 120 with an account management computing system 150 but the user 101 may not need to interact with the user computing device 110 to initiate or complete the hands-free transaction. The method 200 is described with reference to the components illustrated in FIG. 1.

In block 210, a merchant computing system registers with an account management computing system 150 and configures a mobile hotspot on a merchant computing device 130. The method for registering, by a merchant computing system, with an account management computing system 150 and configuring a mobile hotspot on a merchant computing device 130 is described in more detail hereinafter with reference to the method described in FIG. 3. For example, a mobile hotspot comprises a portable hotspot configurable on the merchant computing device 130. For example, a mobile hotspot enables the merchant computing device 130 to act as a mobile router and convert network 120, or 3G, and/or 4G cellular signals to Wi-Fi and vice versa, creating a mobile Wi-Fi network that can be shared by multiple users within a predefined proximity to the merchant computing device 130. In certain examples, the merchant computing device 130 comprises a user computing device 110 with a mobile hotspot capability.

Figure 3:
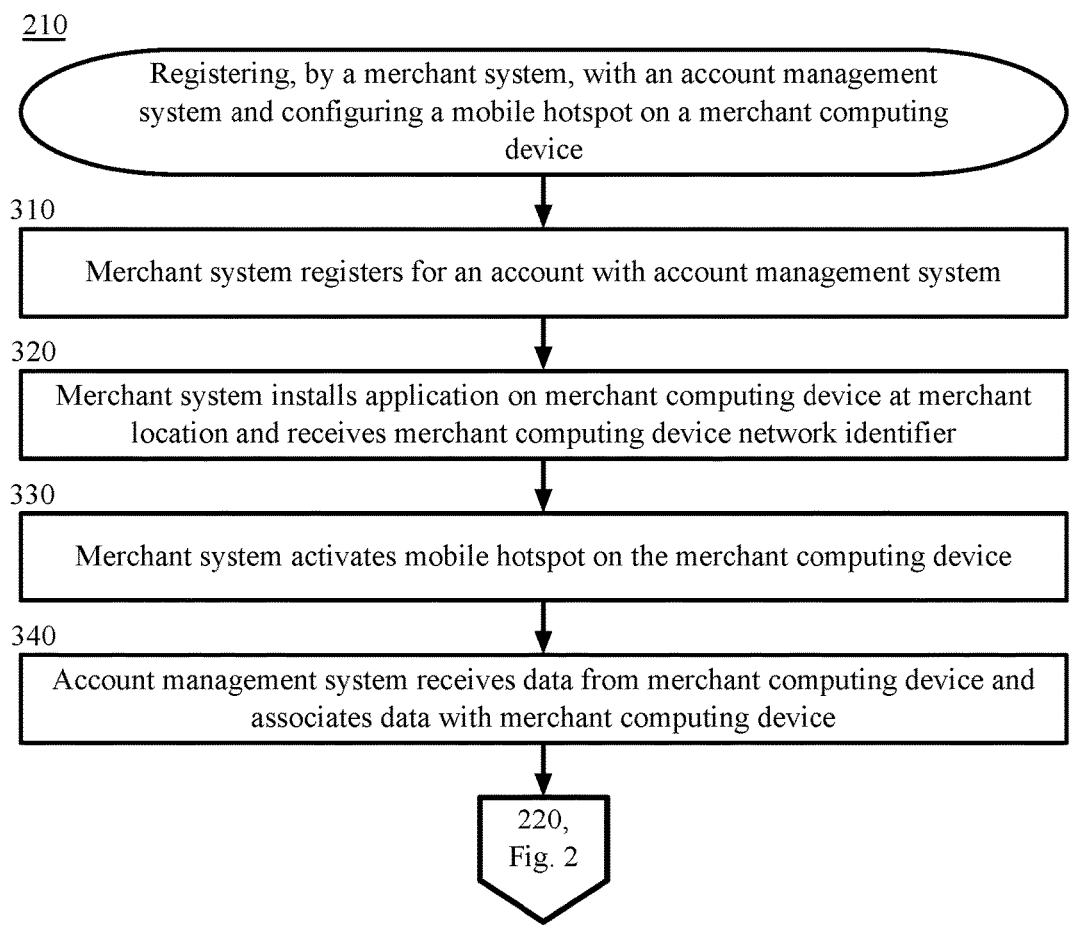
FIG. 3 is a block diagram depicting a method for registering, by a merchant computing system, with an account management computing system and configuring a mobile hotspot on a merchant computing device, in accordance with certain examples.

FIG. 3 is a block diagram depicting a method 210 for registering, by a merchant computing system, with an account management computing system 150 and configuring a mobile hotspot on a merchant computing device 130, in accordance with certain examples. The method 210 is described with reference to the components illustrated in FIG. 1.

In block 310, a merchant computing system registers for an account with an account management computing system 150. For example, a merchant computing device 130 operator 102 accesses an account management computing system 150 website and establishes a merchant computing system account with the account management computing system 150. For example, the merchant computing system provides, to the account management computing system 150 via the network 120, merchant account information, for example, a merchant name, location data associated with one or more merchant locations, and merchant payment account information to associate with the merchant computing system account.

In block 320, the merchant computing system installs a payment application 133 on the merchant computing device 130 at the merchant location and receives a merchant computing device 130 network identifier. For example, the merchant computing device 130 operator 102 selects an interface object on the website of the account management computing system 150 to download the payment application 133 onto the merchant computing device 130 and the merchant computing device 130 receives the payment application 133 via the network 120.

In block 330, the merchant computing device 130 activates a mobile hotspot on the merchant computing device 130. For example, the merchant computing device 130 operator 102 configures settings on the merchant computing device 130 to activate a mobile hotspot on the merchant computing device 130 at a merchant location. The merchant computing device 130 broadcasts the merchant computing device 130 network identifier via a Wi-Fi communication channel when the mobile hotspot is activated. For example, user computing devices 110 in a proximity to the merchant computing device 130 would detect, via a Wi-Fi scan, the merchant computing device 130 network identifier broadcast via the mobile hotspot. In an example, the account management computing system 150 associates the merchant computing device 130 network identifier broadcast via the mobile hotspot with the merchant computing device 130. In this example, the account management computing system 150 determines that one or more user computing devices 110 are in a proximity to the merchant computing device 130 when the account management computing system 150 receives the merchant computing device 130 network identifier from the one or more user computing devices 110 that receive the merchant computing device 130 network identifier via a Wi-Fi communication channel and then transmit the received network identifier to the account management computing system 150 via the network 120. In another example, the account management computing system 150 further associates, with the merchant computing device 130, a merchant computing device 130 hardware identifier, for example, a media access control ("MAC") address, a Wi-Fi access point ("AP") name, a fingerprint, or other identifier received from the merchant computing device 130.

In block 340, the account management computing system 150 receives data comprising the merchant computing device 130 network identifier from the merchant computing device 130 and associates the data comprising the merchant computing device 130 network identifier with the merchant computing device 130. In an example, the merchant computing device 130 communicates the data to the account management computing system 150 via the network 120. In an example, the account management computing system 150 logs a hardware identifier associated with the merchant computing device 130. An example hardware identifier comprises a MAC address, a Wi-Fi AP name, a fingerprint, or other identifier. In an example, the account management computing system 150 executes a set of commands, functions, protocols, or application programming interfaces ("APIs") to log the merchant computing device 130 network identifier. For example, to log the merchant computing device 130 network identifier, the account management computing system 130 executes an example API comprising the form:

```
RegisterService systemResponse registerService system (RegisterService
systemRequest request) message RegisterService systemRequest {optional
Service systemDetails service system_details = 1;}message Service
systemDetails {optional string placeId = 1;optional LatLng lat_Ing =
2;optional int64 mac = 3;optional WifiFingerprint wifi_fingerprint =
4;}messageRegisterService systemResponse {optional string service
system_id = 1;}message LatLng {optional double latitude = 1;optional
double longitude = 2;}
```

In this example API, the Wi-Fi Fingerprint comprises the merchant computing device 130 network identifier. In an example, the data further comprises location data associated with the merchant computing device 131, for example, global positioning system ("GPS") coordinates, an address, or other location identifier. In an example, the account management computing system 150 registers the merchant computing system for a merchant computing system account. For example, the account management computing system 150 generates a merchant computing system identifier for the merchant computing system and maps the location data to the merchant computing device 130 network identifier and the merchant computing system identifier. For example, the account management computing system 150 comprises a database or chart and the account management computing system 150 stores the merchant computing device 130 network identifier received from the merchant computing device 130 via the network 120 with the associated merchant computing system identifier and associated location data also received from the merchant computing device 130 via the network 120 in the database. For example, the account management system 150 stores the merchant computing device 130 network identifier with the associated merchant computing system identifier and associated location data in the database in the data storage unit 156.

In an example, the merchant computing system provides registration information to the account management computing system 150. For example, the merchant computing system provides and indication of the size of one or more merchant locations (for example, small, medium, or large, where each size corresponds to a specified geofence radius) to the account management computing system 150. The account management computing system 150 determines a geofence boundary or virtual perimeter around each of the one or more merchant locations based at least in part on the disclosed size of each of the one or more merchant locations. For example, a merchant computing system location having a smaller radius comprises a geofence boundary having a smaller radius than a merchant computing system location having a larger radius. For example, a small size corresponds to a 10 foot radius, a medium size corresponds to a 50 foot radius, and a large size corresponds to a 300 foot radius. Other appropriate size thresholds for location size may be configured by the account management computing system 150. The account management computing system 150 or merchant computing system should configure a location size considering whether the merchant location is adjacent to a location of another merchant. A location size that is too large may result in another adjacent merchant location being included within the geofence boundary for the location. A location size that is too small may result in users not being identified as being at the location in sufficiently large locations.

From block 340, the method 210 proceeds to block 220 in FIG. 2.

Returning to FIG. 2, in block 220, the user 101 registers with the account management computing system 150 and downloads an application 113 onto the user computing device 110. The method 220 for registering, by a user, for an account with an account management computing system 150 and downloading an application 113 onto a user computing device 110 is described in more detail hereinafter with reference to the method described in FIG. 4.

Figure 4:
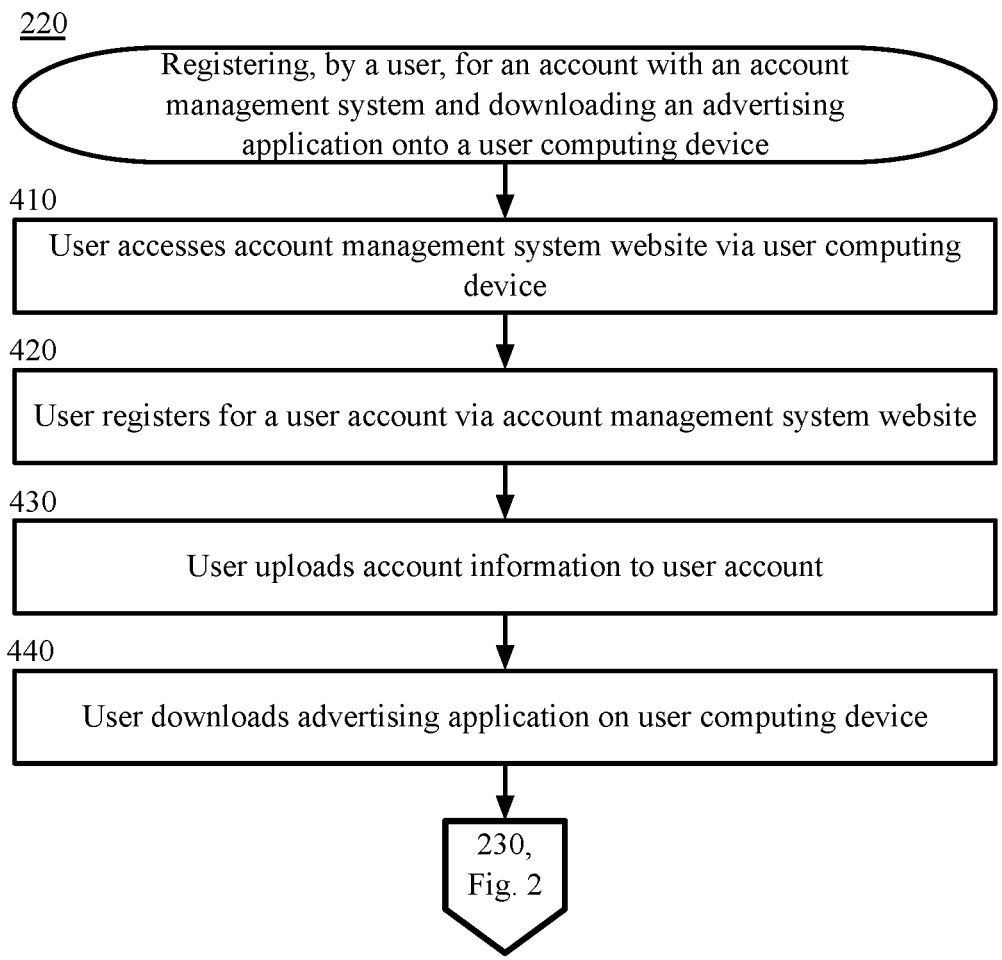
FIG. 4 is a block diagram depicting a method for registering, by a user, for an account with an account management computing system and downloading an application onto a user computing device, in accordance with certain examples.

FIG. 4 is a block diagram depicting a method 220 for registering, by a user, for an account with an account management computing system 150 and downloading an application 113 onto a user computing device 110, in accordance with certain examples. The method 220 is described with reference to the components illustrated in FIG. 1.

In block 410, the user accesses an account management computing system 150 website (not depicted) via the user computing device 110. In an example, the user enters the website address into a web browser or otherwise accesses the website via the user interface 111 of the user computing device 110. In an example, the user actuates a user interface 111 object on an advertisement on the web browser 118 and the web browser 118 redirects to the website.

In block 420, the user registers for a user account via the account management computing system 150 website. The user may obtain a user account number, receive the appropriate applications and software to install on the user computing device 110, request authorization to participate in transaction processing, or perform any action required by the account management computing system 150. The user may utilize the functions of the user computing device 110, such as the user interface 111 and a web browser, to register and configure a user account. In an example, the user may enter account information associated with one or more user accounts, for example, one or more credit accounts, one or more bank accounts, one or more stored value accounts, and/or other appropriate accounts into the user account maintained by the account management computing system.

In block 430, the user uploads user account information to the user account. In an example, the user may configure user account settings or add, delete, or edit account information via the account management computing system 150 website. In an example, the user may select an option to enable or disable the permission of the account management computing system 150 to process transactions. For example, the account information comprises an account number, an expiration date, an address, a user account holder name, or other information associated with the user account that would enable the account management computing system to process a payment transaction. In an example, the user transmits a facial image to the account management computing system via the user computing device 110. The account management computing system 150 associates the facial image with the user account. In another example, the user transmits a username and password or other verification information to the account management computing system 150. The account management computing system 150 associates the username and password or other verification information with the user account.

In block 440, the user downloads the application 113 on the user computing device 110. In an example, the user selects an option on the account management computing system 150 website to download an application 113 onto the user computing device 110. In an example, the application 113 operating on the user computing device is able to communicate with the account management computing system 150 over the network 120. In an example, the application 113 operating on the user computing device 110 is able to communicate with the account management computing system 150 over the network 120 when the user is signed in to the application 113.

From block 440, the method 220 proceeds to block 230 in FIG. 2.

Returning to FIG. 2, in block 230, the user arrives at the merchant computing device and signs into application 113 on user computing device 110. In an example, the user signs into the application before entering the merchant computing system location. In another example, the user signs in to the application 113 at the same time or after the user enters the merchant location. In an example, to sign in to the application 113, the user may enter a username and password or other verification information associated with the user's account management computing system 150 account and select an object on the user interface that reads "sign in." In this example, the application communicates the username and password or other verification information to the account management computing system via the network. In this example, the account management computing system 150 validates the username and password or other verification information for the user account. In this example, if the username and password or other verification information are correct, the account management computing system establishes communication with the application on the user computing device 110 via the network 120.

In block 240, the user computing device 110 conducts a Wi-Fi scan and receives Wi-Fi identifiers and associated signal strength data. In an example, the user brings the user computing device 110 within a threshold distance of the merchant computing device 130. In an example, moving within the threshold distance enables the user computing device 110 to detect the merchant computing device 130 network identifier broadcast via the mobile hotspot of the merchant computing device 130. In an example, in response to the user signing in to the application 113, the application 113 instructs the user computing device 110 to conduct a Wi-Fi scan. For example, the user computing device 110 searches for available Wi-Fi network identifiers broadcast by Wi-Fi network devices in a predefined proximity from the user computing device 110. For example, the user computing device 110 activates the Wi-Fi controller 132, which polls via the antenna 131 for Wi-Fi network identifiers broadcast by Wi-Fi-network devices over Wi-Fi communication channels in a specified proximity to the user computing device 110 and detects a corresponding signal strength associated with each Wi-Fi network identifier. In an example, each detected Wi-Fi network identifier comprises a string of alphanumeric and/or symbolic characters. For example, a Wi-Fi network identifier reads "14o3a98d20is7x82." In other examples, instead of a Wi-Fi scan, the user computing device 110 conducts a Bluetooth low energy ("BLE") scan to detect network device identifiers associated with BLE network devices within a specified proximity from the user computing device 110. In this example, the user computing device 110 activates a BLE controller. In this example, the BLE controller polls via the antenna 131 for BLE network identifiers broadcast by BLE network devices over BLE communication channels in a specified proximity to the user computing device 110 and detects a corresponding signal strength associated with each BLE network identifier. In yet other examples, instead of a Wi-Fi scan or BLE scan, the user computing device 110 conducts a Bluetooth scan to detect network device identifiers associated with Bluetooth network devices within a specified proximity from the user computing device 110. In this example, the user computing device 110 activates a Bluetooth controller. In this example, the Bluetooth controller polls via the antenna 131 for Bluetooth network identifiers broadcast by Bluetooth network devices over Bluetooth communication channels in a specified proximity to the user computing device 110 and detects a corresponding signal strength associated with each Bluetooth network identifier.

In block 250, the user computing device 110 receives the merchant computing device identifier from the merchant computing device 130 broadcast via the mobile hotspot during Wi-Fi scan. For example, a particular one of the one or more received Wi-Fi identifiers received via the Wi-Fi scan comprises the merchant computing device 130 identifier. In another example, a particular one of the one or more received BLE identifiers received via the BLE scan comprises the merchant computing device 130 identifier. In yet another example, a particular one of the one or more received Bluetooth identifiers received via the Bluetooth scan comprises the merchant computing device 130 identifier.

In block 260, the user computing device transmits the received Wi-Fi identifiers, associated signal strength data, and location data to the account management computing system 150. In another example, the user computing device transmits the received BLE identifiers, associated signal strength data, and location data to the account management computing system 150. In yet another example, the user computing device transmits the received Bluetooth identifiers, associated signal strength data, and location data to the account management computing system 150. In another example, the user computing device 110 detects multiple merchant computing device 130 network identifiers via the Wi-Fi scan and transmits the multiple merchant computing device 130 network identifiers to the account management computing system 150 via the network 120. In some examples, the user computing device 110, in addition to transmitting the received merchant computing device 130 network identifier or received multiple merchant computing device 130 network identifiers, logs location data associated with the user computing device 110, and transmits the location data to the account management computing system 150 via the network 120. In some examples, the user computing device 110, when receiving the merchant computing device 130 network identifier or the multiple merchant computing device 130 network identifiers via the Wi-Fi scan, logs a respective signal strength associated with each merchant computing device 130 network identifier and transmits the signal strength along with each merchant computing device 130 network identifier to the account management computing system 150 via the network 120.

In block 270, the account management computing system 150 identifies a location associated with the merchant computing device 130 based on the data received from the user computing device 110. The method for identifying, by an account management computing system 150, a merchant computing device 130 based on data received from a user computing device is described in more detail hereinafter with reference to the method described in FIG. 5.

Figure 5:
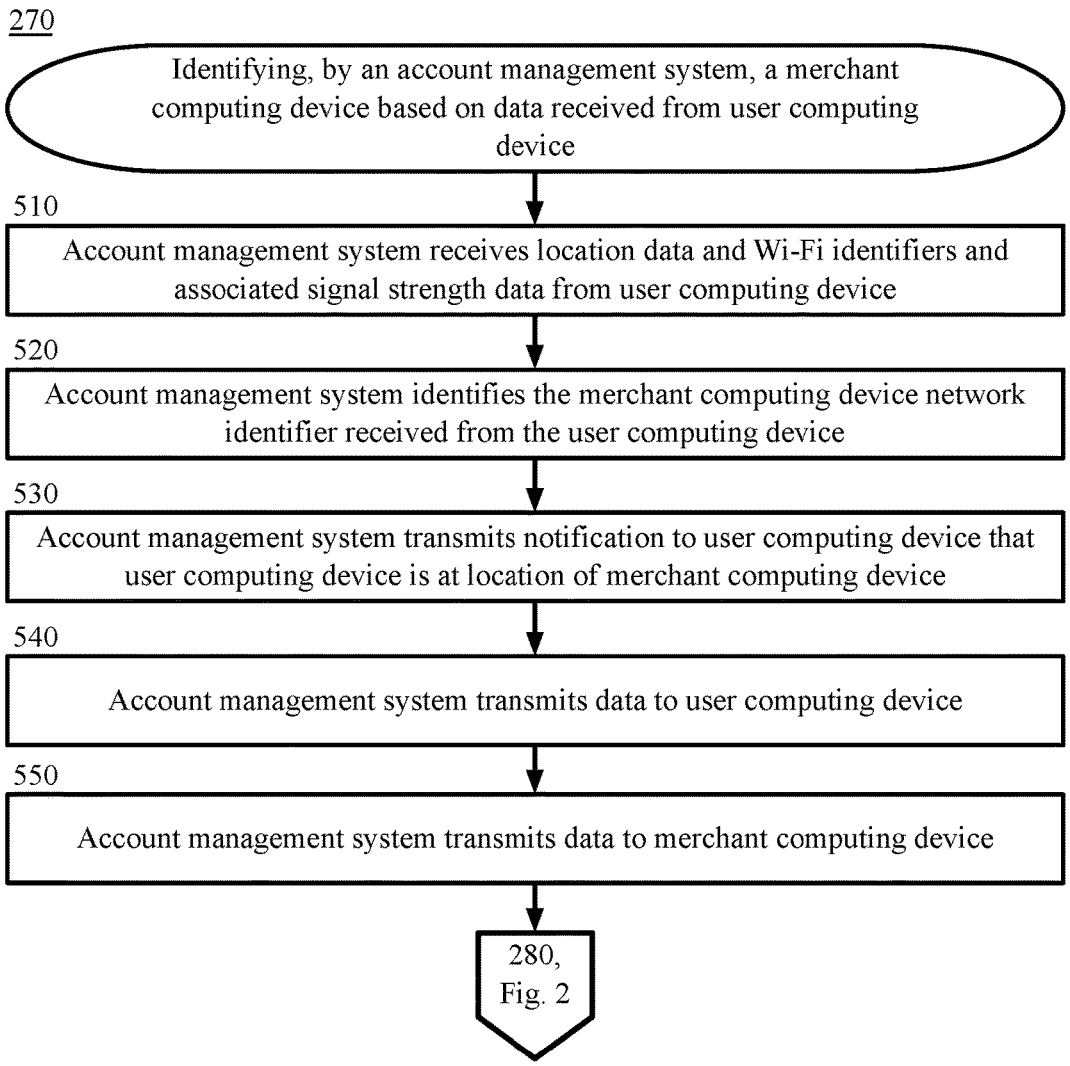
FIG. 5 is a block diagram depicting a method for identifying, by an account management computing system, a merchant computing device based on data received from a user computing device, in accordance with certain examples.

FIG. 5 is a block diagram depicting a method 270 for identifying, by an account management computing system 150, a merchant computing device 130 based on data received from a user computing device 110, in accordance with certain examples. The method 270 is described with reference to the components illustrated in FIG. 1.

In block 510, the account management computing system 150 receives location data, Wi-Fi identifiers, and associated signal strength data from the user computing device 110. For example, the account management computing system 150 receives location data, Wi-Fi identifiers and associated signal strength data from the user computing device 110 via the network 120.

In block 520, the account management computing system 150 identifies the merchant computing device 130 network identifier received from the user computing device 110. In another example, in response to receiving multiple merchant computing device 130 network identifiers, the account management computing system 150 notifies the user computing device 110 that the device is within a predefined proximity from each of the merchant computing systems associated with the multiple merchant computing system identifiers. In an example, the account management computing system 150 accesses a list in a data storage unit 156 that correlates or cross-references merchant computing device 130 network identifiers with merchant computing system identifiers and merchant computing device 130 identifiers. The account management computing system 150 identifies the merchant computing system identifier and merchant computing device 130 identifier associated with the merchant computing device 130 network identifier in the list.

In another example, the list or database in the data storage unit 156 that correlates merchant computing device 130 network identifiers with merchant computing system identifiers further correlates the merchant computing device 130 network identifiers and the associated merchant computing system identifiers with location data. In this example, the account management computing system 150 selects the particular merchant computing system identifier from the multiple identified merchant computing system identifiers with a geofence boundary that comprises the location data received from the user computing device 110. For example, the user computing device 110 received merchant computing device 130 network identifier A and merchant computing device 130 network identifier B via a Wi-Fi scan and transmitted the received merchant computing device 130 network identifiers to the account management computing system 150 via the network 120 along with location data logged by the user computing device 110. In this example, the account management computing system 150 receives the network identifiers A and B and the location data from the user computing device 110 via the network 120. In this example, the user computing device 110 received network identifiers A and B but, based on current location data of the user computing device 110 and geofence boundary data for merchant system A (corresponding to merchant computing device 130 identifier A) and merchant system B (corresponding to merchant computing device 130 identifier B), the user computing device 110 is only within a geofence boundary associated with merchant system B and is not within a geofence boundary associated with merchant system A. In this example, the account management computing system 150 determines that the user computing device is at a location of merchant system B associated with the merchant computing device 130 identifier B in response to determining that the user computing device 110 is within the geofence boundary associated with merchant system B based on the location data received from the user computing device 110.

In block 530, the account management computing system 150 transmits notification to the user computing device 110 that the user computing device 110 is at the location of the merchant computing device 130. For example, in response to identifying the merchant computing device 130 network identifier received from the user computing device 110, the account management computing system 150 transmits, via the network 120, a notification to the user computing device 110 that the user computing device 110 is at the location of the merchant computing device 130. The user computing device 110 receives, via the network 120, the notification that the user computing device 110 is at the location of the merchant computing device 130.

In block 540, the account management computing system 150 transmits data to the user computing device 110. In certain examples, the account management computing system 150 provides the user computing device 110 a list of nearby merchant computing system identifiers and associated merchant computing system locations. In this example, the account management computing system 150 provides the user computing device 110 time-sensitive alerts from specific merchant computing systems. For example, the account management computing system 150 provides the alerts while the user computing device 110 is near the merchant location associated with the merchant computing device 130. In an example, the application 113 operating on the user computing device 110 downloads data associated with all merchant computing system locations within a predefined distance (for example, a one kilometer distance) of the user computing device 110. In an example, the data is pushed to the user computing device 110 or downloaded at predefined time intervals. The application 113 receives geofence boundary data associated with each of the merchant computing system locations. In this example, based on the geofence boundary data, the application 113 sets up a geofence boundary of a predefined distance, for example 50 m, 500 m, one km, or other predefined distance around the user computing device 110 and the application 113 downloads, via the network 120 from the account management computing system 150, data associated with all merchant computing system locations within the geofence boundary. In an example, when the user computing device 110 enters/exits a geofence boundary associated with a particular merchant computing system location, the user computing device 110 executes a set of commands, functions, protocols, or APIs to notify the application 113 that the user computing device 110 is within a geofence boundary associated with the particular merchant computing system location. Once the application 113 is notified that the user computing device 110 is within the geofence boundary associated with the particular location, the application 113 determines the location of proximate merchant computing systems more accurately and updates the API. For example, the updated API uses additional signals like Wi-Fi or BLE communication signals to detect the location of the merchant computing systems accurately. For example, the user computing device 110 identifies merchant computing device 130 network identifiers and signal strengths associated with nearby merchant computing devices 130 via a Wi-Fi, BLE, or Bluetooth scan as described herein. In an example, the user computing device 110 comprises or otherwise accesses a list or database of merchant computing systems and associated merchant computing device 130 identifiers and determines a merchant computing system location from the database or list based on the received network identifiers and signal strength data. For example, the user computing device 110 selects the merchant computing system location corresponding to the received network identifier having the strongest associated signal strength. In an example, in response to selecting a network identifier associated with the merchant computing system location, the user computing device 110 executes an API to register a checkin for the user 101 at the merchant computing system location. Example updated API comprises the form:

CheckInUserResponsecheckInUser(CheckInUserRequest request)message
checkInUserRequest {optional string place_id = 1;}message
checkInUserResponse {optional string service system_details = 1;optional string service system_offers = 2;}

In an example, upon receiving a response, the account management computing system 150 communicates the details of the merchant computing system to the user computing device 110. In some examples, a hotspot on merchant computing device 130 allows the user computing device to receive hotspot strength data to identify the correct merchant computing system location. In response to receiving a check in signal for the user computing device 110, the merchant computing system identifier for the corresponding merchant computing system location is retrieved. Based on the merchant computing system identifier, the account management computing system 150 retrieves offers associated with the merchant computing system and transmits the offers to the user computing device 110 via the network 120. In other examples, based on the merchant computing system identifier, the account management computing system 150 retrieves product listings, store maps, or other data and transmits the data to the user computing device 110 via the network 120. In an example, the user computing device receives the offers, product listings, store maps, or other data via the network 120 from the account management computing system 150.

For example, the application 113 creates a geofence with a 200-meter radius around the user computing device 110. The application 113 downloads all merchant computing system locations within the specified 200-meter radius from the account management computing system 150. In an example, the application 113 determines a confidence value for each merchant computing system location within the specified radius based on signal strength data associated with merchant computing device 130 identifiers corresponding to each merchant computing system location received from the user computing device 110. For example, a first merchant computing device 130 network identifier comprising a greater signal strength has a higher confidence value than a second merchant computing device 130 network identifier comprising a lesser signal strength. Based at least in part on the confidence values, the account management computing system 150 communicates with the one or more merchant computing systems that are located in the specified radius to either show nearby alerts to the user 101 via the user computing device 110 or to check-in the user at to the merchant computing system location. For example, the account management computing system 150 sends offers and alerts to the user computing device 110 via the network 120 for merchant computing systems having confidence values greater than a specified threshold value.

In some examples, the account management computing system 150 adds details about a merchant computing system to a place index or storage database 156 to improve accuracy of location data. For example, the account management computing system 150 maintains data tables regarding merchant computing system location scores. For example a first table reads: S2Cell-to-Place identifier lookup table. Key:

Level 15 identifier. Continuing with this example, Level 15 is approximately 250 meters in both length and width. In an example, a four square kilometer area comprises 64 level-15 S2 cells. Merchant computing system locations may be mapped to each S2 cell to aid in pinpointing a merchant computing system location. In an example, location data received from the user computing device 110 may be mapped to a specific S2 cell in the four square kilometer area associated with a particular merchant computing system location. An example value comprises a list of merchant computing system locations whose center latitude and/or longitude fall in a corresponding S2 Cell. Each S2 Cell should comprise a place identifier associated with the corresponding merchant computing system location.

In an example, the account management computing system 150 stores data about merchant computing system locations in a table that will be helpful with merchant computing system discovery. For example, a media access control ("MAC") address is associated with the merchant computing system location or a Wi-Fi scan model. In other examples, instead of a Wi-Fi scan model, the account management computing system 150 utilizes a BLE scan model or Bluetooth scan model. The account management computing system 150 synchronizes the data in this table to data in a place index, for example table comprising S2 Cells mapped to merchant computing system locations as described herein For example, the place index is updated by the account management computing system 150 weekly, daily, hourly, or at other appropriate intervals. Each row of the table corresponds to separate feature data associated with each merchant computing system location, and the value in the feature data row comprises a proto comprising information for the merchant computing system. For example:

Message XYZPlaceInfo {// Information about the XYZ-store.Optional Place place=1; // Mac(s) of the Wi-Fi Access Point that is installed storerepeated int64 mac=2; // Wi-Fi models for the placerepeated WifiPlaceModel wife place model=3; . . . }

In block 550, the account management computing system 150 transmits data to the merchant computing device 130. In an example, the account management computing system 150 transmits user account identifiers, via the network 120, to the merchant computing device 130 in response to identifying the merchant computing system identifier and the merchant computing device 130 identifier. For example, the merchant computing device 130 identifier comprises a MAC address or other hardware identifier of the merchant computing device 130. In another example, the account management computing system 150 transmits facial images, and/or username data associated with the user account to the merchant computing device 130. In certain examples, multiple user computing devices 110 conduct Wi-Fi scans, receive the merchant computing device 130 identifier, and transmit the merchant computing device 130 identifier to the account management computing system 150. In these examples, the account management computing system 150 transmits user account identifiers, facial images, and/or a username and password or other verification information associated with each user computing device 110 that transmitted the merchant computing device 130 identifier to the account management computing system 150. The merchant computing device 130 receives the user account identifier, the facial template, and the username and password or other verification information associated with the user account and stores the received information on a current user log in a data storage unit accessible to the account management computing system 150. In another example, the merchant computing device 130 receives the multiple user account identifiers, associated facial templates, and associated usernames associated with the multiple user accounts and stores the received information in the current user log in the data storage unit 156.

In an example, the merchant computing device 130 periodically updates the current user log based on updates received from the account management computing system 150. For example, the account management computing system 150 transmits user account identifiers, facial images, and/or a username and password or other verification information associated with each user computing device 110 that transmits the merchant computing device 130 identifier to the account management computing system 150. The merchant computing device 130 receives the user account identifier, the facial template, and the username and password or other verification information associated with the user account and stores the received information on the current user log in a data storage unit accessible to the account management computing system 150. In another example, the merchant computing device 130 receives the multiple user account identifiers, associated facial templates, and associated usernames associated with the multiple user accounts and stores the received information in the current user log in the data storage unit 156. In an example, the account management computing system 150 transmits a subsequent user account identifier of a subsequent user that, while carrying a user computing device 110 via which the user 101 is signed in to the application 113, enters a threshold distance of the merchant computing device 130 required to receive the merchant computing device 130 network identifier broadcast via the mobile hotspot. In this example, the account management computing system 150 receives the merchant computing device 130 network identifier transmitted by the user computing device 110 and transmits user account information, a user facial image, and a username and password or other verification information associated with the user account to the merchant computing device 130.

In another example, in response to detecting that the user computing device 110 associated with a user 101 in the current user log is no longer transmitting the merchant computing device 130 network identifier or is no longer signed in to the application 113, the account management computing system 150 transmits a notice to the merchant computing device 130 that a user account identifier should be removed from the current user log. In this example, the merchant computing device 130 deletes the indicated user account identifier and associated user image and username and password or other verification information from the current user log.

From block 550, the method 270 proceeds to block 280 in FIG. 2.

Returning to FIG. 2, in block 280, the user 101 conducts a transaction at the merchant computing device 130. In an example, the user 101 approaches the merchant computing device 130. The merchant computing device 130 operator 102 totals items of the user 101 for purchase. The merchant computing device 130 operator 102 asks the user 101 to select a payment option. The user 101 directs the merchant computing device 130 operator 102 to initiate a transaction via the application 113. For example, the application 113 is installed on both the merchant computing device 130 and the user computing device 110. The merchant computing device 130 displays the current user log. The merchant computing device 130 operator 102 is able to identify the user during checkout based on the user account information, an associated user facial image, and/or a username and password or other verification information received from the account management computing system 150. For example, the merchant computing device 130 displays a request for the user 101 to input the username and password or other verification information associated with the user account. The user 101 provides the username and password or other verification information via the merchant computing device 130. The merchant computing device 130 displays the user account information associated in the current user log with the user account associated with the entered username and password or other verification information. The merchant computing device 130 operator 102 selects information associated with the user. The merchant computing device 130 operator 102 compares a facial image or name of the user displayed on the merchant computing device 130 to the visual appearance of the current customer at the merchant computing device and/or documentation presented by the user to the merchant computing device 130 operator 102. In an example, the merchant computing device 130 transmits the identity of the user account to the account management computing system 150 via the network 120. For example, after receiving the identity of the user account from the merchant computing device 130, the account management computing system 150 transmits information associated with one or more accounts of the identified user.

The merchant computing device 130 operator 102 selects a user account for the transaction and confirms the transaction with permission and direction of the user. The merchant computing device 130 transmits transaction details to the account management computing system 150. Example transaction details comprise a total amount of the transaction, a selected user account for use in the transaction, an account of the merchant computing system for use in the transaction, and other useful or relevant information. The account management computing system 150 transmits a transaction authorization request via a network 120 to an issuer system 140 based on the transaction details. For example, the issuer system 140 is associated with the user account selected for use in the transaction. The issuer system 140 approves the transaction authorization request and transmits a transaction authorization approval to the account management computing system 150 via the network 120. In another example, the issuer system 140 denies the transaction authorization request and transmits a transaction authorization denial to the account management computing system 150 via the network 120. The account management computing system 150 transmits a transaction receipt to the merchant computing device 130 via the network 120 indicating the approval or denial of the transaction authorization request.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to identify users at service system locations, comprising:
   receiving, by one or more computing devices and from a user computing device, a user account identifier and two or more service computing device identifiers, the user computing device receiving the two or more service computing device identifiers and signal strength data associated with each of the two or more service computing device identifiers via a Wi-Fi scan at a service system location;
   receiving, by the one or more computing devices and from the user computing device, location data logged by the user computing device;
   retrieving, by the one or more computing devices, user account information based at least in part on the user account identifier;
   determining, by the one or more computing devices, a respective geofence boundary associated with each of the two or more received service computing device identifiers;
   comparing, by the one or more computing devices, each respective geofence boundary associated with each of the two or more received service computing device identifiers with the location data received from the user computing device;
   identifying, by the one or more computing device and based on the comparison of each respective geofence boundary, one or more service computing device identifiers corresponding to one or more of the respective geofence boundaries within which the user computing device is located;
   ranking, by the one or more computing devices, each of the one or more identified service computing device identifiers corresponding to the one or more geofence boundaries within which the user computing device is located according to the corresponding signal strength data associated with each of the identified one or more service computing device identifiers;
   selecting, by the one or more computing devices, a particular service computing device identifier having a highest signal strength from the identified one or more service computing device identifiers corresponding to the one or more geofence boundaries within which the user computing device is located; and
   transmitting, by the one or more computing devices, the user account information to a particular service computing device associated with the particular service computing device identifier.

2. The method of claim 1, further comprising determining, by the one or more computing devices, that the user computing device is signed in to an application, wherein transmitting the user account information to the particular service system computing device is performed in response to determining that the user computing device is signed in to the application.

3. The method of claim 2, further comprising:
   determining, by the one or more computing devices, that the user computing device has signed out of the application at a time after determining that the user computing device is signed in to the application;
   in response to determining that the user computing device is not signed in to the application, transmitting, by the one or more computing devices and to the particular service system computing device, an instruction to the delete the user account information from the service system computing device; and
   removing, by the one or more computing devices, a facial template of the user and a service system location from a current user log.

4. The method of claim 1, wherein the user account information transmitted to the service system computing device comprises one or more of a facial image and a username and password associated with the user account, and wherein the method further comprises:
   displaying, by the service system computing device, one or more of the facial image and a request for the user to input the username and password, and
   receiving, via the service system computing device, one or more of a selection of the user by an operator of the service system computing device and an input of the username and password by the user,
   wherein the selection of the user account information is based on one or more of the received selection of the user by the operator of the service system computing device and the received input of the username and password by the user.

5. The method of claim 1, further comprising:
   in response to identifying the service system computing device associated with the service system computing device network identifier, transmitting, by the one or more computing devices, one or more data to the user computing device.

6. The method of claim 1, further comprising:
determining, by the one or more computing devices and based on the location data received from the user computing device, a second geofence boundary around the user computing device;
determining, by the one or more computing devices, that one or more geofence boundaries associated with one or more corresponding service computing device identifiers coincide with the second geofence boundary around the user computing device; and
transmitting, by the one or more computing devices, information associated with each of one or more service locations associated with the one or more corresponding service computing device identifiers.

7. The method of claim 6, wherein the geofence boundary around the user computing device comprises a specified radius around the user computing device.

8. A computer program product, comprising:
a non-transitory computer-readable medium having computer-executable program instructions embodied thereon that when executed by a computer cause the computer to identify users, the computer-executable program instructions comprising:
computer-executable program instructions to receive, from a user computing device, a user account identifier and two or more service computing device identifiers, the user computing device receiving the two or more service computing device identifiers and signal strength data associated with each of the two or more service computing device identifiers via a Wi-Fi scan at a service system location;
computer-executable program instructions to receive, from the user computing device, location data logged by the user computing device;
computer-executable program instructions to retrieve user account information based at least in part on the user account identifier;
computer-executable program instructions to determine a respective geofence boundary associated with each of the two or more received service computing device identifiers;
computer-executable program instructions to compare each respective geofence boundary associated with each of the two or more received service computing device identifiers with the location data received from the user computing device;
computer-executable program instructions to identify, based on the comparison of each respective geofence boundary, one or more service computing device identifiers corresponding to one or more of the respective geofence boundaries within which the user computing device is located;
computer-executable program instructions to rank each of the one or more identified service computing device identifiers corresponding to the one or more geofence boundaries within which the user computing device is located according to the corresponding signal strength data associated with each of the identified one or more service computing device identifiers;
computer-executable program instructions to select a particular service computing device identifier having a highest signal strength from the identified one or more service computing device identifiers corresponding to the one or more geofence boundaries within which the user computing device is located; and computer-executable program instructions to transmit the user account information to a particular service computing device associated with the particular service computing device identifier.

9. The computer program product of claim 8, further comprising computer-executable program instructions to determine that the user computing device is signed in to an application, wherein transmitting the user account information to the particular service system computing device is performed in response to determining that the user computing device is signed in to the application.

10. The computer program product of claim 8, further comprising:
computer-executable program instructions to determine that the user computing device is not signed in to the application at a time after determining that the user computing device is signed in to the application;
computer-executable program instructions to transmit, to the particular service system computing device in response to determining that the user computing device is not signed in to the application, an instruction to the delete the user account information from the service system computing device; and
computer-executable program instructions to remove a facial template of the user and a service system location from a current user log.

11. The computer program product of claim 8, wherein the user account information transmitted to the service system computing device comprises a facial image and/or a username and password associated with the user account, wherein the service system computing device displays the facial image and/or a request for the user to input the username and password, wherein the service system computing device receives a selection of the user by an operator of the service system computing device and/or an input of the username and password by the user, and wherein the selection of the user account information is based on the received selection of the user by the operator of the service system computing device and/or the received input of the username and password by the user.

12. The computer program product of claim 8, further comprising:
in response to identifying the service system computing device associated with the service system computing device network identifier, computer-executable program instructions to transmit one or more data to the user computing device.

13. The computer program product of claim 8, further comprising:
computer-executable program instructions to determine, based on the location data received from the user computing device, a geofence boundary around the user computing device;
computer-executable program instructions to determine that one or more geofence boundaries associated with one or more corresponding service locations coincide with the geofence boundary around the user computing device; and
computer-executable program instructions to transmit information associated with each of the one or more service locations comprising geofence boundaries that coincide with the geofence boundary around the user computing device.

14. The computer program product of claim 13, wherein the geofence boundary around the user computing device comprises a specified radius around the user computing device.

15. A system to identify users, comprising:
a storage device; and
a processor communicatively coupled to the storage device, wherein the processor executes application code instructions that are stored in the storage device to cause the system to:
  receive, from a user computing device, a user account identifier and two or more service computing device identifiers, the user computing device receiving the two or more service computing device identifiers and signal strength data associated with each of the two or more service computing device identifiers via a Wi-Fi scan at a service system location;
  receive, from the user computing device, location data logged by the user computing device;
  retrieve user account information based at least in part on the user account identifier;
  determine a respective geofence boundary associated with each of the two or more received service computing device identifiers;
  compare each respective geofence boundary associated with each of the two or more received service computing device identifiers with the location data received from the user computing device;
  identify, based on the comparison of each respective geofence boundary, one or more service computing device identifiers corresponding to one or more of the respective geofence boundaries within which the user computing device is located;
  rank each of the one or more identified service computing device identifiers corresponding to the one or more geofence boundaries within which the user computing device is located according to the corresponding signal strength data associated with each of the identified one or more service computing device identifiers;
  select a particular service computing device identifier having a highest signal strength from the identified one or more service computing device identifiers corresponding to the one or more geofence boundaries within which the user computing device is located; and
  transmit the user account information to a particular service computing device associated with the particular service computing device identifier.

16. The system of claim 15, wherein the processor further executes application code instructions that are stored in the storage device to cause the system to determine that the user computing device is signed in to an application, wherein transmitting the user account information to the particular service system computing device is performed in response to determining that the user computing device is signed in to the application.

17. The system of claim 15, wherein the processor further executes application code instructions that are stored in the storage device to cause the system to:
  determine that the user computing device is not signed in to the application at a time after determining that the user computing device is signed in to the application;
  transmit, to the particular service system computing device in response to determining that the user computing device is not signed in to the application, an instruction to the delete the user account information from the service system computing device; and
  remove a facial template of the user and a service system location from a current user log.

18. The system of claim 15, wherein the user account information transmitted to the service system computing device includes a facial image and/or a username and password associated with the user account, and wherein the processor further executes application code instructions that are stored in the storage device to cause the system to:
  display, by the service system computing device, the facial image and/or a request for the user to input the username and password, and
  receive, via the service system computing device, a selection of the user by an operator of the service system computing device and/or an input of the username and password by the user,
  wherein the selection of the user account information is based on the received selection of the user by the operator of the service system computing device and/or the received input of the username and password by the user.

19. The system of claim 15, wherein the processor further executes application code instructions that are stored in the storage device to cause the system to:
  determine, based on the location data received from the user computing device, a geofence boundary around the user computing device;
  determine that one or more geofence boundaries associated with one or more corresponding service locations coincide with the geofence boundary around the user computing device; and
  transmit information associated with each of the one or more service locations comprising geofence boundaries that coincide with the geofence boundary around the user computing device.

20. The system of claim 19, wherein the geofence boundary around the user computing device comprises a specified radius around the user computing device.

* * * * *